United States Patent Office 3,383,090
Patented May 14, 1968

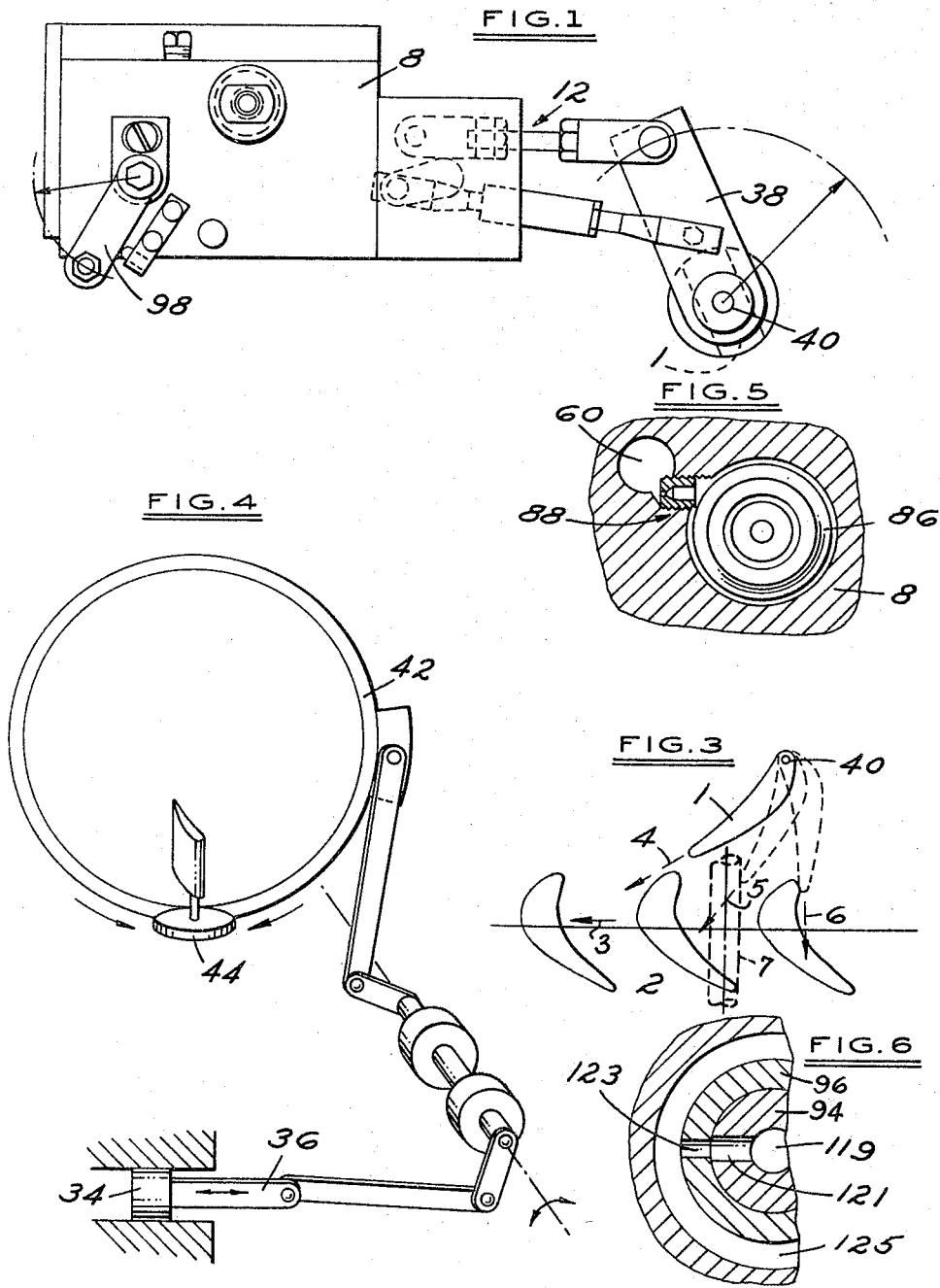

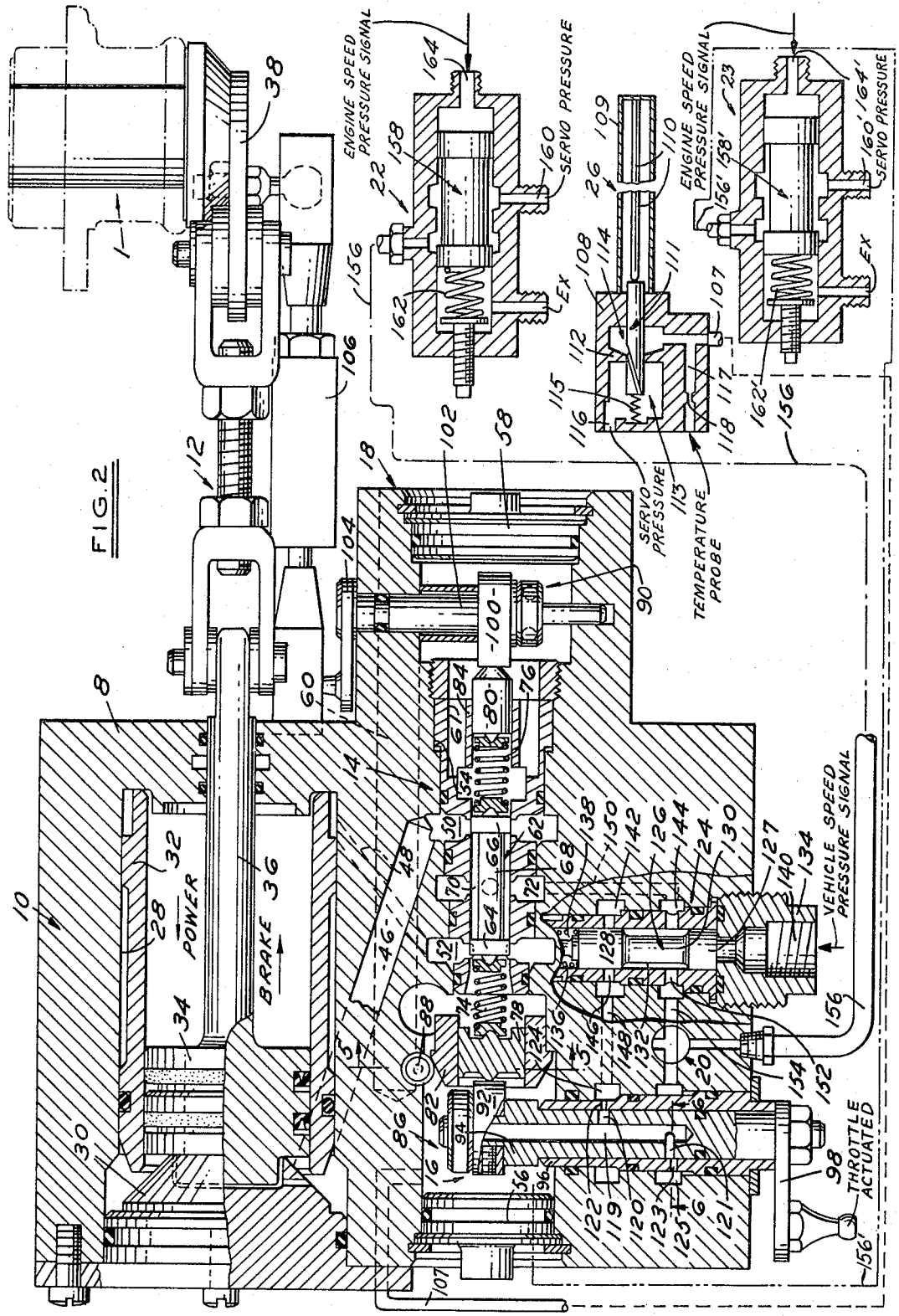

3,383,090
FLUID PRESSURE CONTROL FOR A TURBINE NOZZLE ACTUATOR
Arthur F. McLean, Livonia, Mich., assignor to Ford Motor Company, Dearborn, Mich., a corporation of Delaware
Filed Dec. 30, 1966, Ser. No. 606,369
8 Claims. (Cl. 253—59)

ABSTRACT OF THE DISCLOSURE

A fluid pressure regulating valve mechanism sensitive to engine output shaft speed for automatically effecting a rotation of the gas turbine engine power turbine nozzles and engine output shaft if the output shaft overspeeds to a position braking the rotation of the power turbine when the main engine clutch is disengaged to shift gear ratios in the vehicle transmission; and, of which the following is a specification.

This invention relates, in general, to a fluid pressure control system. More particularly, it relates to a control system for a gas turbine engine that is installed in a motor vehicle.

Motor vehicle gas turbine engines generally provide for a change in the engine output speed by not only controlling the fuel supply, but also by changing the pitch of the power turbine nozzles. The adjustability of the nozzles, therefore, is used as a control for the various acceleration, deceleration and braking phases of operation of the turbine.

From an operator's standpoint, the most desirable method of operating the vehicle is to have essentially only three main controls, namely, the vehicle accelerator pedal, the transmission selector lever, and the vehicle brake pedal. To accomplish this, the nozzle actuator system should provide a precise adjustment of the turbine nozzles in accordance with power demand as indicated by the degree of movement of the accelerator pedal so that the engine can be brought up rapidly to and maintained in a particular operating condition, such as, for example, with a constant turbine inlet temperature. Also, the nozzle control system should be capable of automatically decelerating the engine, and indirectly the vehicle speed, when the turbine inlet or exit temperatures rise above a safe level, or the accelerator pedal is released to an idle speed position so that undesirably high turbine inlet temperatures and other conditions will not occur, or the engine output shaft overspeeds. Furthermore, the nozzle actuating system should provide some control of the engine to permit operation of the vehicle accessories, such as, for example, the air conditioning, power steering, and other systems, from the engine power output shaft.

The invention satisfies the above requirements by providing a nozzle actuating system that consists, in general, of a fluid pressure operated servo device for accurately adjusting the positions of the turbine nozzles; a fluid controlling shuttle mechanism for controlling the movement of the servo; an accelerator pedal control and nozzle motion feedback mechanism for regulating the movement of the shuttle valve; and a number of auxiliary control means for braking the rotation of the engine output shaft when the throttle lever is released to its engine idle speed position, or the turbine section temperature rises above a safe operating level, or the vehicle clutch pedal is depressed.

The primary object of this invention is to provide a speed sensitive fluid pressure control for a turbine nozzle pitch adjusting mechanism that will automatically control the attitude of the nozzles upon overspeed of the engine output shaft when the vehicle clutch pedal is depressed to disengage the main engine clutch.

A further object of the invention is to provide a control system of the type described above in which the engine output shaft is braked when the engine output shaft speed exceeds a predetermined value.

Other objects, features and advantages of the invention will become apparent upon reference to the succeeding, detailed description thereof, and to the drawings illustrating the preferred embodiment thereof; wherein, FIGURE 1 is a side-elevational view of a turbine nozzle actuating system embodying the invention;

FIGURE 2 is an enlarged cross-sectional plan view, with parts broken away and in section, of the nozzle actuating system shown in FIGURE 1;

FIGURE 3 is a schematic cross-sectional view of a turbine nozzle and turbine blade;

FIGURE 4 is a schematic illustration of a control assembly; and

FIGURES 5 and 6 are cross-sectional views of details taken on planes indicated by and viewed in the direction of arrows 5—5 and 6—6, respectively, of FIGURE 2.

FIGURES 1 and 2 show one view of a turbine nozzle control that embodies the invention. It would be secured as an accessory to the housing (not shown) of a gas turbine engine (also not shown). The details of the gas turbine engine are not given since they are known and are believed to be unnecessary for an understanding of the invention. Suffice it to say that the engine would have one or more conventional axial flow type compressor and power turbines, and that the stationary power turbine nozzles indicated schematically at 1 would be positioned between the usual diffuser section and power turbine rotor blades 2 (FIGURE 3) to control the direction of discharge of combustion product gases to effect the desired rotation of the turbine rotor or rotors.

FIGURE 3 shows, schematically, the cooperation between a typical turbine nozzle 1 and an axial flow turbine blade 2 fixedly mounted on a power output shaft 7, indicated in dotted lines. The range of movement of the nozzle for rotation and acceleration of turbine blade 2 in the direction of arrow 3 is indicated in general by dotted lines 4 and 5. When the nozzle moves between these positions, the gas will discharge against the back side of turbine blade 2 and thus rotate it forwardly.

During the initial accelerating phase of the motor vehicle, the nozzles 1 will be moved clockwise progressively towards the full line position 4 as a function of the position of the vehicle accelerator pedal to provide rotation of the turbine and engine output shaft as called for. On the other hand, if the turbine inlet or exit temperature is excessive, or the vehicle operator releases the accelerator pedal, such as, for example, during vehicle deceleration or engine idle speed operation, or the engine output shaft overspeeds when the vehicle clutch pedal is depressed, the nozzles 1 will be pivoted progressively backwards toward the dotted line braking position 6 so as to change the direction of discharge of the gases from the nozzles to strike the front portions of the turbine blades 2 to thereby retard rotation of the rotor blades 2 in the forward direction. Retarding the power turbine rotation will, of course, retard the engine output shaft rotation since they normally are interconnected by suitable reduction gearing, not shown.

FIGURE 2, which is essentially to scale, shows the details of the control system. It includes, in general, a combined housing and valve body 8; a servo mechanism 10 that is operatively connected by suitable push-pull type linkage 12 to the turbine nozzles 1; a shuttle valve mechanism 14 that controls the flow of fluid to operate servo mechanism 10; an accelerator pedal rotated throttle valve member 16 for controlling the movement of shuttle valve mechanism 14; a power feedback mechanism 18 for rearming the shutttle valve mechanism by returning it to a neutral position when the nozzles move to the position selected; and operator-controlled transmission selector control valve 20 for effecting rotation of the nozzles to brake the power turbine when the vehicle transmission is in neutral; and four controls for braking the engine output shaft at times, namely, two engine output shaft speed sensitive valve means 22 and 23; a vehicle speed sensitive valve 24, and a turbine section temperature sensitive means 26.

More specifically, servo mechanism 10 includes a stepped diameter cylindrical bore 28 closed at one end by a conically-shaped cap 30 that abuts and locates a cylindrical sleeve 32. The sleeve encloses an annular piston 34 having an actuating rod 36 that projects through housing 8 to a connection with linkage means 12. The linkage in this particular case, as best seen in FIGURE 1, rotates a lever 38 that is fixed in a suitable manner to turbine nozzle 1 to rotate it about its pivot point 40 (FIGURE 3). In practice, the nozzles would all rotate as a unit, in a manner similar to that shown in FIGURE 4; that is, the piston rod would rotate a ring gear 42 in mesh with a gear 44 secured to each nozzle.

Piston 34 is reciprocated in opposite directions by alternately admitting fluid under pressure to opposite ends of the bore of sleeve 32 through suitable passages 46 and 48. These latter passages are connected to a pair of annular fluid manifolds 50 and 52 that are controlled by shuttle valve mechanism 14.

The shuttle valve mechanism is mounted in a stepped diameter bore 54 that is closed at opposite ends by caps 56 and 58. The bore has a main drain passage 60 connected to a sump, not shown. The bore also has a sleeve member 61 that slidably and sealingly supports a spool valve 62. The spool valve is of a known type having spaced lands 64 and 66 interconnected by a neck portion 68 to define a fluid annulus 70. The annulus is connected at all times to an annular fluid pressure supply passage 72 that is supplied with fluid under pressure from any suitable source, not shown, whenever the engine compressor is driven.

Spool valve 62 is normally positioned in a central or neutral position blocking flow of fluid from passage 72 to either of the servo passages 46 and 48. The shuttle valve is urged towards this position by a pair of centering springs 74 and 76 that are seated against cam followers 78 and 80. The cam followers are slidably mounted within suitable sleeves 82 and 84 non-movably fixed in the valve body.

The bore 54, cap 56, sleeve 82 and left-hand cam follower 78 together define a fluid chamber 86. The chamber is essentially closed except for controlled orifice connection 88 (see FIGURE 5) to main drain passage 60, for a purpose to be described later. Right-hand cam follower 80, together with bore 54, sleeve 61 and cap 58, form a second chamber 90 that is connected at all times to drain passage 60.

Left-hand cam follower 78 abuts against the profiled surface of a cam 92 that is fixed for rotation with the throttle valve member 16. This member projects into fluid chamber 86 and includes a shaft 94 that is rotatably mounted within a sleeve 96 fixed within housing 8. Shaft 94 is connected at its opposite end to a lever 98 that is adapted to be connected to the conventional motor vehicle accelerator pedal linkage (not shown) so that movement of the accelerator pedal will swing lever 98 by a proportionate amount.

The right-hand cam follower 80 abuts against the profiled surface of a cam 100 that is fixed for rotation with a power feedback control shaft 102. This shaft, at its opposite end, is suitably connected by a lever 104 and push-pull linkage 106 to the radially inner portion of lever 38 (FIGURE 1) that is rotatable with the turbine nozzles 1. This construction transmits the nozzle rotation back through cam 100 to shuttle valve 62 to return it to its neutral position to maintain the piston 34 in the position selected by the position of throttle valve member cam 92.

With the construction as thus far described, the valve assembly will provide for accelerating and decelerating positions of nozzles 1 in accordance with the movement of the vehicle accelerator pedal and rotation of throttle valve member 16. As stated previously, however, other controls are also desired for preventing excessive turbine section temperatures, and excessive engine output shaft speeds when the transmission is in neutral condition and/or the vehicle accelerator pedal is released to an engine idle speed position.

Consider first the control to aerodynamically brake the power turbine when the turbine inlet or exit temperature rises above a desired value. Left-hand fluid chamber 86 is connected at all times to a fluid conduit 107 that contains a signal fluid pressure supplied by the temperature sensing means or probe 26. This latter means includes a housing 108 having a hollow probe 109 of high expansion material enclosing and confining a stem 110 of low expansion material. Stem 110 is abutted by a needle-like valve member 111 that slides through an aperture 112 connecting two fluid chambers 113 and 114, and is biased against stem 110 by a spring 115.

Chamber 113 is connected by a line 116 to a source of regulated fluid under pressure, which could be a branch of main supply port 72. Chamber 114 is connected to line 107. Housing 108 also contains a fluid return line 117 having a fixed bleed orifice 118 permitting a pressure build-up in chamber 114 and line 107.

The thermal sensitive probe 109 would be inserted in the turbine section of the engine, either at the gas inlet or exit portions, or both, as desired, so as to sense the changes in gas temperature therein.

In operation, if the turbine gas temperature rises above a safe operating level, the probe outer housing 109 will expand relative to stem 110 and thereby permit spring 115 to move valve 111 to the right to increase the fluid flow between chambers 113 and 115 and line 107. Assuming a correct size of orifice 88 in shuttle valve chamber 86, the increased flow into chamber 86 will cause a pressure build-up sufficient to move cam follower 78 to the right away from throttle member cam 92. This will cause shuttle valve 62 to move to the position shown, or beyond, to supply fluid through servo line 46. Piston 34 will then be moved to rotate the turbine nozzles 1 towards the open braking position 6. The resultant opening movement of the turbine nozzles, with respect to the gas passage, will decrease the turbine temperature and simultaneously slow down the turbine.

Consider now the control to brake the turbine and thereby indirectly retard creep of the vehicle during engine idle speed operation, when the transmission is engaged for a drive condition. Throttle member shaft 94 has a central bore 119 that is open at one end to chamber 86, and has restricted crossbores 120 and 121 of different sizes. The bores 120 and 121 are adapted to cooperate with different size orifices 122 and 123 in sleeve 96 that are connected at all times to annular fluid manifolds 124 and 125. As best seen in FIGURE 6, the crossbores of shaft 94 are so arranged that when the shaft is rotated by the vehicle accelerator pedal to the engine idle speed position shown in FIGURE 6, the shaft crossbores 120 and 121 will be aligned with the flow restricting orifices 122 and 123. Thus, any fluid under pressure in the manifolds 124 and 125 will have a controlled flow into the central bore 119 and out into chamber 86 to pressurize the chamber and move cam follower 82 away from cam 92. The degree of pressurization of chamber 86 will again, of course, depend upon the size of the drain orifice 88, and whether both manifolds 124 and 125 contain fluid, or just one.

The supply of fluid to manifolds 124 and 125 is controlled by the vehicle speed sensitive valve mechanism 24, the transmission selector lever valve 20, the engine output speed sensitive valve 22. Valve mechanism 24 includes a spool valve 126 sildably mounted within a sleeve fixed in the valve body or housing 8. The spool valve has spaced lands 127 and 128 interconnected by a neck portion 130 defining an annular fluid chamber 132. The valve is biased to the position shown against an adapter plug 134 by a spring 136, the chamber 138 containing the spring being vented to exhaust through a port not shown. The opposite end of the valve is adapted to be moved upwardly by fluid under pressure admitted through a passage 140 from a vehicle output shaft speed sensitive source of fluid under pressure (not shown) that develops a pressure that changes with changes in vehicle speed.

The valve body for valve 126 has annular manifolds 142 and 144. Manifold 142 is connected by ports 146 to the valve bore and by a passage 148 to throttle valve manifold 124. Manifold 144 is connected by a passage 150 to a main fluid supply passage 72 and by ports 152 to the valve bore. Manifold 144 is also connected by passage 154 past selector lever control valve 20 to throttle valve manifold 125.

In the position shown, valve 126 connects fluid under pressure from line 150 directly to throttle member manifold 125, when valve 20 is in the position shown. When the vehicle output shaft speed is above a predetermined value, the pressure in line 140 raises valve 126 so that fluid will also flow through passage 148 to the throttle valve manifold 124.

Valve 20 provides the transmission selector lever control of the nozzle position. This valve has a 90° rotation between two positions permitting flow to throttle valve member manifold 125 either from the vehicle speed sensitive valve 126 through line 154, or from the engine output shaft speed sensitive valve 22 through a line 156. Valve 20 would be connected to the vehicle transmission selector lever by suitable linkage, not shown. Moving the selector lever to a drive position would move valve 20 to the position shown. Moving the selector lever to a neutral position would rotate the valve 90° counterclockwise to connect the throttle valve manifold 118 to line 156.

Both engine output shaft speed sensitive valve mechanisms 22 and 23 have essentially identical constructions. Each includes a spool valve 158, 158' slidably mounted in the valve body to control flow of fluid under pressure to lines 156, 156' from branches 160, 160' of the shuttle valve main supply passage 72. The valves are normally biased to the right by springs 162, 162' to close lines 156, 156', and are moved to the positions shown by different signal fluid pressures in lines 164, 164' that increase as a function of the increase in speed of a pump or other suitable member driven by the engine output shaft. The only differences between valves 22 and 23 are in the initial preloads of springs 162 and 162', and the connections of the output lines 156, 156' to the system.

The force of spring 162 of valve 22 is chosen so that the fluid pressure force developed in line 164 will overcome the spring to supply line 156 with controlling fluid at all engine output shaft speeds above a chosen engine idle speed. The fluid output of valve 23, on the other hand, is connected directly by line 156' to the throttle chamber 86 so as to act directly on the end of the shuttle valve plug 78 whenever valve 158' is in a position to supply fluid to line 156'. The force of spring 162', in this case, is chosen such that valve 158' will not supply fluid to line 156' until the engine output shaft overspeeds or exceeds a chosen maximum value. That is, only when the output shaft rotates above a predetermined maximum value will the fluid pressure in line 164' be sufficient to overcome the force of spring 162' and move valve 158' to admit fluid from supply line 160' to throttle chamber 86 through line 156'.

The purpose of valve 23 is to prevent an overspeed of the engine output shaft when the load is suddenly taken off the shaft during a de-clutching movement by the vehicle operator. That is, when the operator depresses the conventional clutch pedal associated with a manually shiftable transmission, and disengages the connection between the engine output and transmission input shafts, the engine shaft could immediately tend to speed up. Control valve 23 prevents an overspeed of the engine shaft and decreases the speed to a level permitting a synchronized shaft in the transmission and a smooth re-engagement of the clutch.

The over-all operation is as follows: When the engine is inoperative, the nozzles 1 will be somewhere in the turbine braking range since the accelerator pedal will have been released, and one or more of the controls described will have increased the pressure in chamber 86 sufficiently to cause the piston 34 to rotate the nozzles to this position. Assume, therefore, that the vehicle is standing still, the vehicle accelerator pedal is released, and the gas turbine engine is idling at a desired speed, with the transmission selector lever in neutral. Engine output shaft speed valves 158 and 158' will be in positions blocking lines 156 and 156', vehicle speed valve 126 will be in the position shown, and transmission selector lever valve 20 will be rotated 90° to the left blocking flow from valve 126 through passage 154. Therefore, there will be no flow of fluid into chamber 86 except that which may be due to the turbine temperature control 26, and the piston 34 and nozzles 1 will remain in the braking position.

If now the engine output shaft speed should, for some reason, increase above the idle level, the increase in pressure of the fluid acting against valve 158 will move it to the left to connect lines 160 and 156 and thus, through selector valve 20 and the bore 119 of throttle valve shaft 94, pressurize chamber 86. This moves cam follower 78 and shuttle valve 62 to the right, admitting fluid from port 72 to servo passage 46. Piston 34 thus is urged to the right to rotate the nozzles 1 towards a greater turbine braking position, which will reduce the engine output shaft speed and close the cycle.

Assume now that the operator depresses the clutch pedal and moves the transmission selector lever to drive position. If during this time, the engine output shaft speed should increase above the maximum desired level, the increase in pressure of the fluid acting against valve 158' will move it to the left to connect lines 160' and 156' and thus pressurize chamber 86. This causes the movement of the power turbine nozzles towards the braking position, in the same manner as described above.

At the same time, because of the movement of the transmission selector lever, valve 20 moves to the position shown, and connects the fluid in manifold 144 of valve 126 to the throttle valve shaft bore 119 through orifice 123 and port 121. Fluid will then pressurize chamber 86 a predetermined abount sufficient to maintain the engine output shaft braked in substantially the same manner as described above.

If the operator now depresses the accelerator pedal, all communication of fluid to chamber 86, except that from temperature control 26 and control valve 23, is immediately cut off, thus permitting the chamber to be drained through the orifice 88 and relieve the pressure build-up against cam follower 78. The progressive or quick depression of the accelerator pedal now rotates throttle shaft 94 and cam 92 to relieve the pressure on cam follower 78 and spring 74 and permit opposite centering spring 76 to move shuttle valve 62 to the left. This opens servo passage 48 to supply port 72, while connecting servo line 46 to drain line 60 through the right end chamber 90. Piston 34 thus moves progressively to the left and rotates nozzles 1 to their closed, turbine accelerating positions 5 and 4. As the nozzles rotate, the feedback exerted through linkage 106, 104 and shaft 102 rotates cam 100 to relieve the force on cam follower 80 and spring 76. The shuttle valve 62 thus begins to move back towards a neutral position under the influence of spring 74. The fluid supply to servo passage 48 thus is progressively cut off and finally terminated when the nozzles 1 have reached the accelerating position corresponding to the degree of depression of the accelerator pedal and rotation of throttle control member cam 92.

It will be clear that if the driver should partially release the accelerator pedal, that rotation of cam 92 in the opposite decelerating direction will cause a reverse operation of the shuttle valve mechanism. That is, shuttle valve 62 will be moved to the right to connect supply port 72 and servo passage 46 so that piston 34 will be moved to actuate the nozzles to a lesser accerlating position, depending upon the new position of the acclerator pedal.

If, after the vehicle has been accelerated, the operator should completely release the accelerator pedal to its idle speed position, both orifices 122 and 123 in throttle valve shaft 94 are opened to control passages 148 and 154. If the vehicle speed is above a predetermined value, valve 126 will have been moved upwardly by the speed sensitive fluid pressure in line 140 so that fluid under pressure in line 150 now is supplied through both lines 148 and 154, thereby pressurizing chamber 86 to a high value. This moves cam follower 78 and shuttle valve 62 to the right causing piston 34 to move in a rightward direction to actuate the nozzles 1 to their maximum turbine braking positions.

If, at the same time, the transmission selector valve 20 should be moved to a neutral position (rotated 90° to the left), supply of braking pressure to the throttle member manifold 125 from valve 126 through line 154 would be cut off; however, manifold 125 would now be supplied from line 156, if we assume the engine output shaft speed is above the set value. The engine output shaft would then again be braked. Of course, if the engine output shaft speed is below the idle speed level but the vehicle speed is not, flow through the upper passage 148 alone is still sufficient to rotate the nozzles towards their turbine braking positions when the accerator pedal is in its engine idle speed condition.

From the foregoing, therefore, it will be seen that the invention provides a control system for a motor vehicle gas turbine engine that provides orientation of the turbine inlet nozzles as a function of the position of the vehicle accelerator pedal, the clutch pedal, and the turbine section temperature; and that it provides engine braking whenever the turnbine section temperature is excessive or the accelerator pedal is released to its idle speed postion, and the vehicle speed is above a predetermined value, or the transmission selector lever is placed in neutral position and/or the engine output shaft speed is above a desired value.

The invention thus provides many advantages; namely, the turbine nozzles can be positioned accurately to maintain given engine operating conditions; any schedule of nozzle positions can be accommodated by correct profiles of the cams on the throttle member and feedback mechanism; idle and braking positions of the nozzles can be achieved separate from the requirements for maintaining given engine conditions; the servo shuttle valve action achieves fast response; the vehicle automatic transmission can be placed in neutral at engine idle speed operation; while the transmission is in neutral or park or start codition, the engine output shaft speed is governed, thereby preventing an overspeed of the engine and maintaining the gear noise level and other members to an acceptable level and permitting a driving of the accessories, such as air conditioning, from the engine output shaft; the engine will be easier to start, and a smaller starter motor can be used because the transmission can be placed in neutral; a manual transmission can be used with the gas turbine engine; and, the engine will not suffer the large temperature and surge changes associated with changes in accessory power because the accessories can be driven while the transmission is in neutral.

While the invention has been illustrated in its preferred embodiments, it will be clear to those skilled in the arts to which the invention pertains that many changes and modifications may be made thereto without departing from the scope of the invention.

I claim:

1. In a gas turbine engine having a power output shaft operably driven by a rotating power turbine, and power operated means for operably retarding at times the rotation of said power turbine,
   the improvement comprising, speed responsive means operably connected to said power operated means and said shaft
   and movable independently of other speed regulating controls, when speeds are obtained above a predetermined speed of rotation of said shaft, to operably actuate automatically said power operated means to retard the rotation of said power turbine.

2. In a gas turbine engine as described in claim 1, said power operated means having fluid pressure movable control means when movable towards one position effecting a power turbine retarding movement of said power actuated means,
   said speed responsive means comprising,
   a fluid pressure regulating valve,
   a source of supply pressure,
   conduit means operably connecting said source and said control means for moving said control means towards said one position,
   a valve body in said conduit means having an inlet connected to said source and an outlet connected to said control means,
   said valve body slidably containing said regulating valve movable from an initial position blocking communication between said inlet and outlet to positions permitting flow therebetween,
   and speed responsive actuating means responsive to the speed of rotation of said output shaft operably connected to and acting on said valve for moving said valve from said initial position above a predetermined speed of said shaft.

3. In a gas turbine engine as described in claim 2, including spring means biasing said valve to said initial position, said speed responsive actuating means comprising a fluid at a pressure that varies as a function of the change in speed of said shaft.

4. In a gas turbine engine as described in claim 3, the said predetermined speed of said shaft being the maximum desired speed of rotation of said shaft,
   said regulating valve means supplying a progressively increasing fluid pressure force to said control means above said predetermined speed whereby said power operated means applies a progressively increasing retarding force to the rotation of said power turbine and output shaft.

5. In a gas turbine engine having a power output shaft, a power turbine nozzle adjustable between power turbine and output shaft braking and non-braking positions, a reciprocable fluid pressure actuated servo mechanism connected to said nozzle for moving said nozzle, a source of fluid under pressure, conduit means connecting said source and mechanism, and shuttle means in said conduit means reciprocable to control the flow of fluid to opposite portions of said mechanism,
   the improvement comprising,
   additional control means in said conduit means between said source and shuttle means and movable between non-supply and supply positions controlling a supply of fluid to a portion of said shuttle means for moving said shuttle means to a position operably effecting a braking of said power turbine,
   and means operably connecting said additional control means to said engine output shaft for movement of said latter control means to a supply position in response to the attainment of a predetermined speed of said shaft.

6. In a gas turbine engine as described in claim 5, said additional control means comprising a valve slidably movable in a valve body having a fluid inlet connected to said source and a fluid outlet operably connected to said shuttle means, said valve being slidable progressively between an initial position closing communication between said inlet and outlet and positions supplying fluid at progressively increasing pressures to said outlet.

7. In a gas turbine engine as described in claim 6, said means operably connecting said additional control means to said output shaft comprising, a source of fluid under a pressure that varies in response to changes in speed of said shaft, spring means biasing said valve to its initial position, said latter source being connected to and acting on said valve for moving said valve against the force of said spring means above a predetermined shaft speed to supply fluid from said inlet to said outlet.

8. In a gas turbine engine as described in claim 7, the predetermined speed of said shaft coinciding with the maximum desired operating speed of said engine output shaft whereby a progressive braking is operably applied to said shaft proportional to the shaft speed increase above the desired speed.

References Cited
UNITED STATES PATENTS

| | | | |
|---|---|---|---|
| 3,181,295 | 5/1965 | Pauwels et al. | 60—39.16 |
| 3,252,686 | 5/1966 | Chadwick | 60—39.25 X |

JULIUS E. WEST, *Primary Examiner.*